United States Patent
Goleski et al.

(10) Patent No.: US 9,945,428 B2
(45) Date of Patent: Apr. 17, 2018

(54) CLUTCH ASSEMBLY AND TRANSMISSION

(71) Applicant: FORD GLOBAL TECHNOLOGIES, LLC, Dearborn, MI (US)

(72) Inventors: Gregory Daniel Goleski, Rochester Hills, MI (US); Steven Gerald Thomas, Bloomfield Hills, MI (US); Jeffrey Edward Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 666 days.

(21) Appl. No.: 14/057,325

(22) Filed: Oct. 18, 2013

(65) Prior Publication Data

US 2014/0113761 A1 Apr. 24, 2014

Related U.S. Application Data

(60) Provisional application No. 61/717,226, filed on Oct. 23, 2012.

(51) Int. Cl.
*F16D 13/52* (2006.01)
*F16H 3/62* (2006.01)
*F16D 25/0638* (2006.01)
*F16D 48/02* (2006.01)
(Continued)

(52) U.S. Cl.
CPC ............ *F16D 13/52* (2013.01); *F16D 21/06* (2013.01); *F16D 25/0638* (2013.01); *F16D 48/0206* (2013.01); *F16H 3/62* (2013.01); *F16H 3/66* (2013.01); *F16D 2500/1087* (2013.01); *F16H 2200/0069* (2013.01); *F16H 2200/2012* (2013.01); *F16H 2200/2046* (2013.01)

(58) Field of Classification Search
USPC ....... 475/282, 275, 271, 277, 330, 278, 280, 475/284, 116; 74/606 R; 192/48.611, 192/110 R, 48.609, 3.63, 3.27, 48.618
See application file for complete search history.

(56) References Cited

U.S. PATENT DOCUMENTS

| | | | | |
|---|---|---|---|---|
| 3,765,519 A | * | 10/1973 | Kell | ............................ 188/366 |
| 3,776,066 A | * | 12/1973 | Piret | ........................... 475/148 |
| 4,957,195 A | * | 9/1990 | Kano et al. | ............... 192/106 F |

(Continued)

FOREIGN PATENT DOCUMENTS

| | | |
|---|---|---|
| CN | 101779060 A | 7/2010 |
| EP | 1780435 A2 | 5/2007 |
| WO | 2012048211 A2 | 4/2012 |

OTHER PUBLICATIONS

Chinese Office Action dated Nov. 3, 2017 for corresponding Chinese Application No. 20141002059537, 7 pages.

*Primary Examiner* — David J Hlavka
(74) *Attorney, Agent, or Firm* — James Dottavio; Brooks Kushman P.C.

(57) ABSTRACT

A transmission utilizes a three clutch module. The clutch module may be pre-assembled before it is assembled into the transmission. All three clutch packs are splined to a common shell at their outer diameter. One of the clutch pistons passes through openings in the clutch pack of one of the other clutches. The common shell is fixedly coupled to a hollow shaft through which the transmission input shaft protrudes. Pressurized fluid to engage the three clutches is routed through axial passageways in the input shaft.

19 Claims, 2 Drawing Sheets

(51) Int. Cl.
  *F16H 3/66* (2006.01)
  *F16D 21/06* (2006.01)

(56) References Cited

U.S. PATENT DOCUMENTS

| | | | |
|---|---|---|---|
| 5,887,690 A * | 3/1999 | Haupt | 192/48.611 |
| 6,464,059 B1 | 10/2002 | Kundermany et al. | |
| 6,929,576 B2 | 8/2005 | Armstrong et al. | |
| 7,232,022 B2 * | 6/2007 | Aoki et al. | 192/106 F |
| 7,470,208 B2 | 12/2008 | Tiesler et al. | |
| 7,604,558 B2 * | 10/2009 | Okada et al. | 475/159 |
| 7,712,594 B2 | 5/2010 | Gremplini et al. | |
| 7,789,792 B2 | 9/2010 | Kamm et al. | |
| 7,980,986 B2 | 7/2011 | Kamm et al. | |
| 8,075,441 B2 * | 12/2011 | Hart et al. | 475/282 |
| 8,092,336 B2 | 1/2012 | Hart et al. | |
| 8,105,196 B2 * | 1/2012 | Portell et al. | 475/116 |
| 8,182,388 B2 | 5/2012 | Gumpoltsberger | |
| 8,197,377 B2 * | 6/2012 | Hart et al. | 475/286 |
| 8,262,526 B2 * | 9/2012 | Portell et al. | 475/116 |
| 8,281,915 B2 * | 10/2012 | Kato et al. | 192/48.611 |
| 8,453,817 B2 * | 6/2013 | Schrage | 192/48.611 |
| 8,475,325 B2 * | 7/2013 | Janson et al. | 475/331 |
| 8,500,588 B2 * | 8/2013 | Diemer et al. | 475/116 |
| 2010/0279814 A1 | 11/2010 | Brehmer et al. | |

\* cited by examiner

CLUTCH ASSEMBLY AND TRANSMISSION

CROSS-REFERENCE TO RELATED APPLICATIONS

This application claims the benefit of U.S. Provisional Application No. 61/717,226, filed Oct. 23, 2012, the disclosure of which is incorporated in its entirety by reference herein.

TECHNICAL FIELD

This disclosure relates to the field of automatic transmissions for motor vehicles. More particularly, the disclosure pertains to a multiple clutch module.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns. A number of gearing elements, such as planetary gear sets, are interconnected with the input shaft, output shaft, and housing by a number of shift elements such as brakes and clutches. Various transmission speed ratios are established by selectively engaging various subsets of the shift elements.

SUMMARY OF THE DISCLOSURE

A transmission includes an input shaft and a shell, each supported for rotation about a transmission axis. First, second, and third clutch packs are splined at their outer diameters to the shell with the second clutch pack axially between the first and third clutch packs. Each clutch pack includes a pressure plate splined to the shell and may include a reaction plate and separator plates splined to the shell. Friction plates splined to clutch hubs may be interspersed with the pressure plates, separator plates, and reaction plate. First, second, and third pistons slide axially with respect to the shell applying an axial force that squeezes the clutch packs such that they transmit torque. The first piston is axially located between the second and third pistons. To reach the first clutch pack, the first piston extends through openings in the pressure plate, separator plates, and reaction plate of the second clutch pack. The shell may be fixedly coupled to a hollow shaft having a set of passageways that conduct pressurized fluid from the input shaft to a set of respective apply chambers to exert force of the respective pistons. A fourth passageway may conduct unpressurized fluid to balance chambers to prevent unintended clutch application due to centrifugal forces.

In another embodiment, a transmission includes an input shaft defining four axial passageways, a hollow shaft supported for rotation with respect to the input shaft and defining four radial passageways, and five seals that connect the respective passageways while segregating the fluid from fluid in other passageways. Three clutches selectively couple the hollow shaft to three transmission gears in response to fluid pressure in three respective axial passageways.

A three clutch module may be assembled outside the transmission housing for ease of installation. The clutch module includes a hollow shaft, a shell fixedly coupled to the hollow shaft, three clutch packs splined to the shell, and three pistons that slide axially to apply force to the clutch packs. A first piston extends through openings in a second clutch packs to apply force to a first clutch pack. Passageways within the hollow shaft may transmit pressurized fluid to apply chambers for each of the clutches. An additional passageway may transmit unpressurized fluid to balance chambers. Up to three clutch hubs may be included in the three clutch module or, alternatively, may be splined to the clutch module after installation in a transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
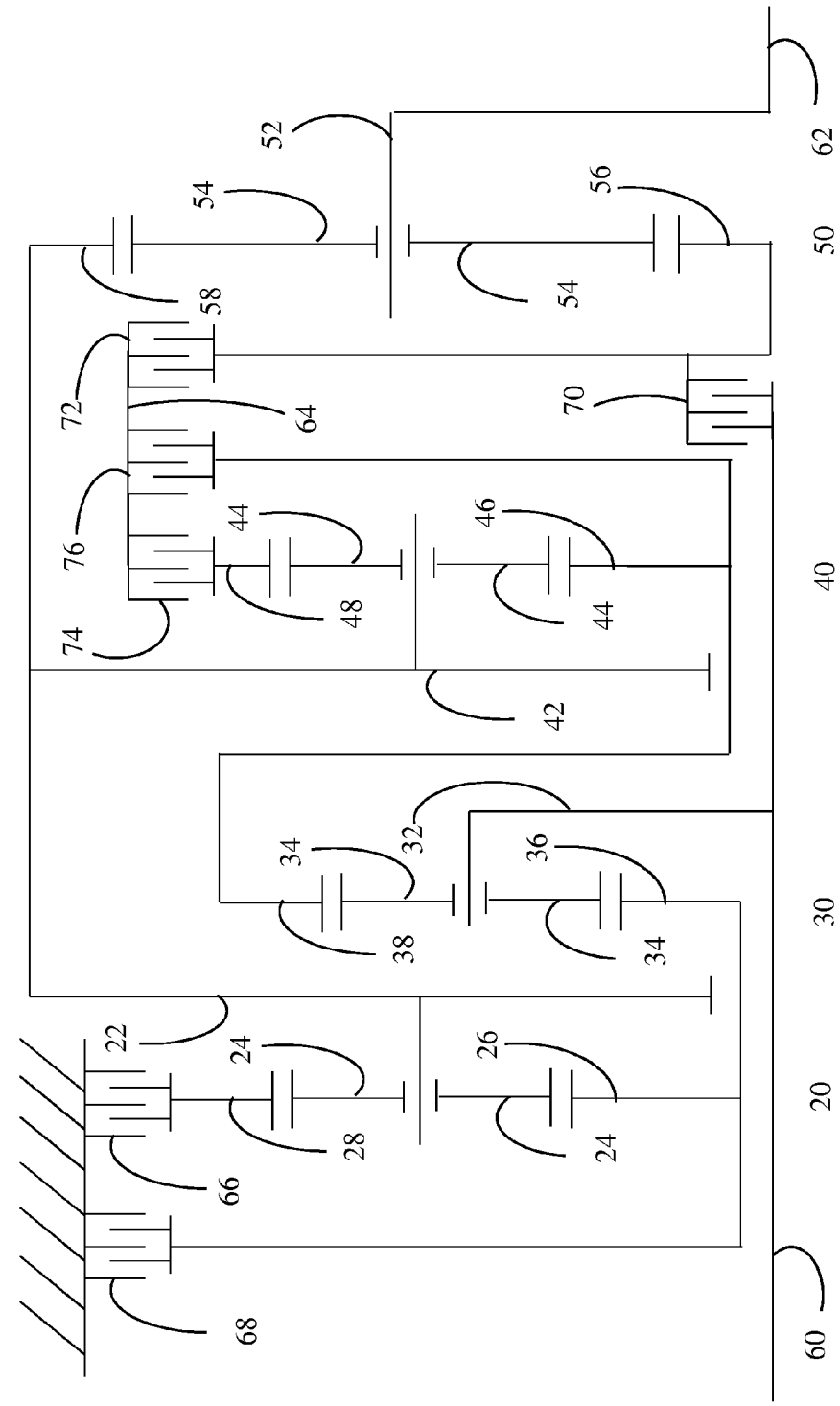
FIG. 1 is a schematic diagram of a transmission gearing arrangement.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A suggested ratio of gear teeth for each planetary gear set is listed in Table 1.

TABLE 1

| | |
|---|---|
| Ring 28/Sun 26 | 2.20 |
| Ring 38/Sun 36 | 1.75 |
| Ring 48/Sun 46 | 1.60 |
| Ring 58/Sun 56 | 3.70 |

Sun gear 26 is fixedly coupled to sun gear 36, carrier 22, carrier 42, and ring gear 58 are mutually fixedly coupled, ring gear 38 is fixedly coupled to sun gear 46, input shaft 60 is fixedly coupled to carrier 32, and output shaft 62 is fixedly coupled to carrier 52. Ring gear 28 is selectively held against rotation by brake 66 and sun gears 26 and 36 are selectively held against rotation by brake 68. Input shaft 60 is selectively coupled to sun gear 56 by clutch 70. Intermediate shaft 64 is selectively coupled to sun gear 56 by clutch 72, selectively coupled to ring gear 48 by clutch 74, and selectively coupled to ring gear 38 and sun gear 46 by clutch 76.

As shown in Table 2, engaging the clutches and brakes in combinations of four establishes ten forward speed ratios and one reverse speed ratio between input shaft 60 and output shaft 62. An X indicates that the clutch is required to establish the speed ratio. An (X) indicates the clutch can be applied but is not required. In $1^{st}$ gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

| | 66 | 68 | 70 | 72 | 74 | 76 | Ratio | Step |
|---|---|---|---|---|---|---|---|---|
| Rev | X | X | | X | X | | −4.79 | 102% |
| $1^{st}$ | X | X | X | (X) | | | 4.70 | |
| $2^{nd}$ | X | X | | X | | X | 2.99 | 1.57 |
| $3^{rd}$ | X | | X | X | | X | 2.18 | 1.37 |
| $4^{th}$ | X | | | X | X | X | 1.80 | 1.21 |
| $5^{th}$ | X | | X | | X | X | 1.54 | 1.17 |

TABLE 2-continued

| | 66 | 68 | 70 | 72 | 74 | 76 | Ratio | Step |
|---|---|---|---|---|---|---|---|---|
| $6^{th}$ | X | | | X | X | X | 1.29 | 1.19 |
| $7^{th}$ | | | X | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | | X | X | X | 0.64 | 1.08 |

Figure 2:
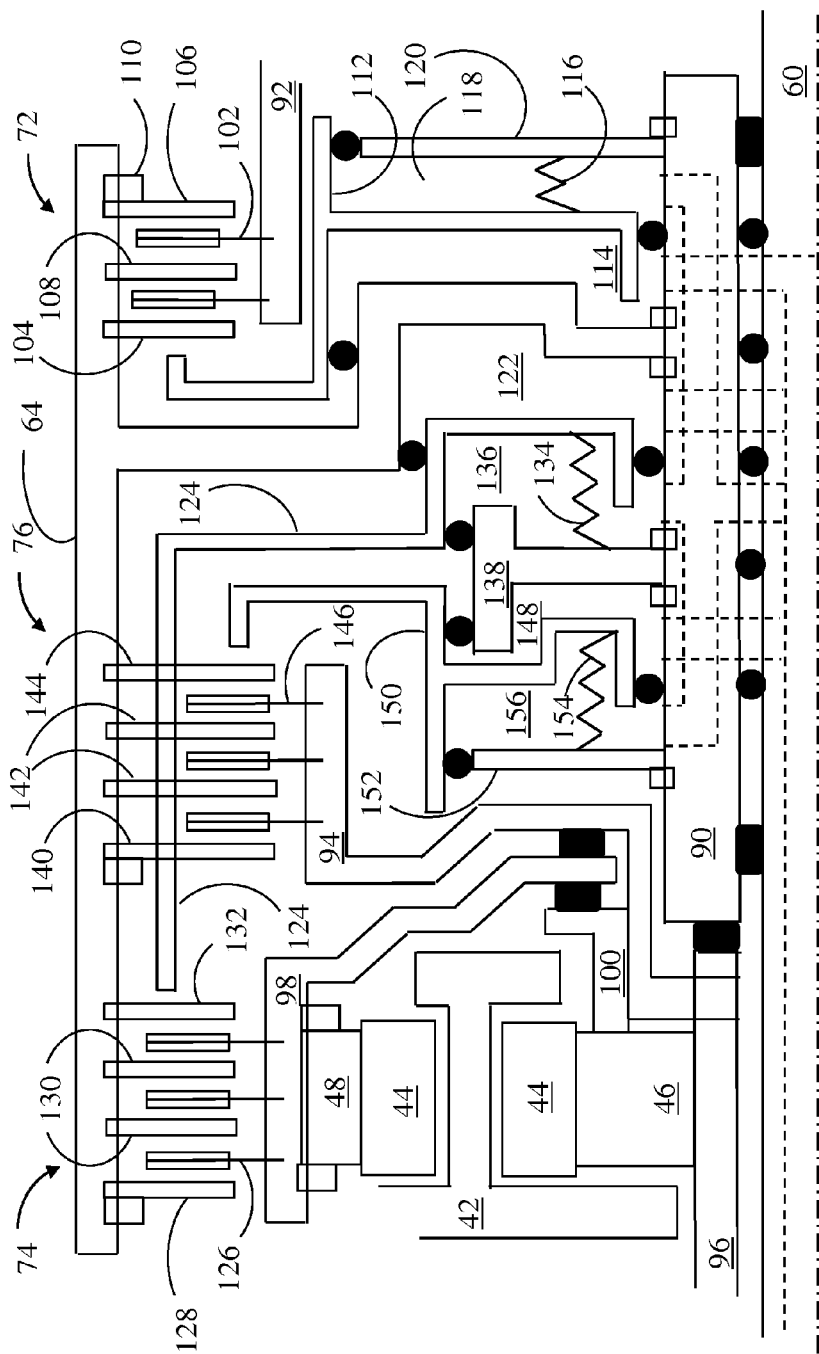
FIG. 2 is a cross sectional view of a three clutch module suitable for use in the gearing arrangement of FIG. 1.

FIG. 2 shows an integrated three clutch module containing clutches 72, 74, and 76. Hollow shaft 90 is supported on input shaft 60 and fixedly coupled to shell 64. Pressurized fluid flows from axial passageways in input shaft 60 into passageways within hollow shaft 90 between seals such that each passageway in the hollow shaft is associated with a particular passageway in the shaft. Some passageways may be cast into the hollow shaft when it is formed. Other passageways may be drilled after forming. Some passageways run axially at various circumferential positions. Certain of the passageways may be partially defined by a separate insert.

Clutch hub 92 is fixedly coupled to sun gear 56. Clutch hub 94 is fixedly coupled to hollow shaft 96 which is in turn fixedly coupled to sun gear 46 and ring gear 38. Clutch hub 98 is fixedly coupled to ring gear 48. Clutch hub 98 is axially located by thrust bearing that separate it from clutch hub 94 and spacer 100 which is located by sun gear 46.

Each clutch includes a clutch pack including at least one friction plate, a pressure plate, and a reaction plate. For example, clutch 72 includes friction plates 102 splined to hub 92, and pressure plate 104 and reaction plate 106 splined to shell 64. If there are multiple friction plates, they are interleaved with separator plates 108 which are splined to shell 64. Snap ring 110 prevents reaction plate 106 from moving axially. When piston 112 moves to the right, the clutch pack is squeezed together such that torque is transmitted between hub 92 and shell 64 by frictional forces.

One passageway provides fluid to chamber 114 which is formed by piston 112, shell 64, and hollow shaft 90. When the fluid in chamber 114 is pressurized, it forces piston 112 toward pressure plate 104. Axial force applied by the piston squeezes the clutch pack such that torque is transmitted between hub 92 and shell 64 by frictional forces. When the pressure is relieved, return spring 116 forces piston 112 away from pressure plate 104 to disengage clutch 72. As hollow shaft 90 rotates, fluid in chamber 114 is pressurized by centrifugal acceleration potentially resulting in un-commanded partial engagement of clutch 72. To counteract this possibility, unpressurized fluid may be continuously provided to the balance chamber 118 defined by piston 112, hollow shaft 90, and reaction member 120.

Clutch 74 is structured similarly. Friction plates 126 are splined to hub 98 and interleaved between reaction plate 128, separator plates 130, and pressure plate 132. Another passageway in input shaft 60 provides fluid to chamber 122 which is formed by piston 124, shell 64, and hollow shaft 90. Pressurizing the fluid in chamber 122 engages clutch 74. When the pressure is relieved, return spring 134 forces piston 124 away from pressure plate 132 to disengage clutch 74. Unpressurized fluid may be continuously provided to balance chamber 136 defined by piston 124, hollow shaft 90, and reaction member 138 to counteract centrifugal pressurization.

The clutch pack for clutch 76 is adapted to allow piston 124 for clutch 74 to extend through the clutch pack. Reaction plate 140, separator plates 142, and pressure plate 144 are splined to shell 64 at their outer edges. Each has openings between the splines and the area that interfaces with friction plates 146. Piston 124 does not need to extend over the full circumference. Instead, it has fingers that reach through the openings in reaction plate 140, separator plates 142, and pressure plate 144. This is feasible because these components always rotate at the same speed as each other. Clutch 76 is engaged by providing pressurized fluid to chamber 148 defined by piston 150, hollow shaft 90, and reaction member 138. When the pressure is relived, return spring 154 forces piston 150 into the disengaged position. Unpressurized fluid may be continuously provided to balance chamber 156 defined by piston 150, hollow shaft 90, and reaction member 152 to counteract any centrifugal engagement tendency. Hollow shaft 90 includes an axial passageway conveying unpressurized fluid to chambers 156, 136, and 118 from a single axial passageway in input shaft 60.

This three clutch module may be a sub-assembly which is assembled outside the transmission case and installed into the transmission as a unit. The sub-assembly may include hollow shaft 90, shell 64, pistons 124, 150, and 112, reaction members 152, 138, and 120, and the pressure plates, reaction plates, separator plates and friction plates for clutches 72, 74, and 76. Assembly of the module starts by installing shell 64 on hollow shaft 90 and installing snap rings to prevent axial movement. Then, piston 112, return spring 116, and reaction member 120 are installed and secured with a snap ring into hollow shaft 90. Next, pressure plate 104, separator plate 108, and reaction plate 106 are splined to shell 64 interleaved with friction plates 102 which remain unsecured at their inner diameters. Snap ring 110 secures the clutch pack for clutch 72 in place. Working from the opposite end, piston 124, return spring 134, and reaction member 138 are installed and secured with a snap ring. Then, piston 150, return spring 154, and reaction member 152 are installed and secured with a snap ring. Finally, the clutch packs for clutches 74 and 76 are splined to shell 64 and secured. Hub 92 may be installed into the transmission case before the sub-assembly and splined to friction plates 102 as the sub-assembly is installed. Clutch hubs 94 and 98 may be splined to friction plates 146 and 126 respectively either before installation of the sub-assembly or after.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A clutch module comprising:
a hollow shaft having an inner surface;
a shell fixedly coupled to the hollow shaft;
first, second, and third pressure plates splined to the shell; and
first, second, and third pistons configured to slide axially with respect to the hollow shaft and to apply axial force directly to the first, second, and third pressure plates respectively, wherein the first piston extends through an opening in the second pressure plate.

2. The clutch module of claim 1 further comprising:
first, second, and third reaction plates fixed to the shell;
a first friction plate disposed between the first pressure plate and the first reaction plate;
a second friction plate disposed between the second pressure plate and the second reaction plate; and
a third friction plate disposed between the third pressure plate and the third reaction plate.

3. The clutch module of claim 2 wherein:
the first piston, the hollow shaft, and the shell define a first apply chamber; and
the hollow shaft defines a passageway between the inner surface and the first apply chamber.

4. The clutch module of claim 2 wherein:
the second piston, the hollow shaft, and a first reaction member define a second apply chamber; and
the hollow shaft defines a passageway between the inner surface and the second apply chamber.

5. The clutch module of claim 2 wherein:
the third piston, the hollow shaft, and the shell define a third apply chamber; and
the hollow shaft defines a passageway between the inner surface and the third apply chamber.

6. The clutch module of claim 2 wherein:
the first piston, the hollow shaft, and a first reaction member define a first balance chamber; and
the second piston, the hollow shaft, and a second reaction member define a second balance chamber; and
the third piston, the hollow shaft, and a third reaction member define a third balance chamber; and
the hollow shaft defines a passageway between the inner surface, the first balance chamber, the second balance chamber, and the third balance chamber.

7. The clutch module of claim 2 further comprising a second clutch hub splined to the second friction plate.

8. The clutch module of claim 7 wherein the second clutch hub is fixedly coupled to a sun gear.

9. The clutch module of claim 7 further comprising a first clutch hub splined to the first friction plate.

10. The clutch module of claim 9 wherein the first clutch hub is fixedly coupled to a ring gear.

11. The clutch module of claim 2 further comprising a third clutch hub splined to the third friction plate.

12. A transmission comprising:
an input shaft supported for rotation about a transmission axis;
a shell supported for rotation with respect to the input shaft;
first, second, and third pressure plates, each pressure plate having an outer edge splined to the shell; and
first, second, and third pistons configured to slide axially with respect to the shell and to apply axial force to the first, second, and third pressure plates respectively.

13. The transmission of claim 12 further comprising:
first, second, and third reaction plates fixed to the shell;
first, second, and third clutch hubs;

a first friction plate splined to the first clutch hub and disposed between the first pressure plate and the first reaction plate;

a second friction plate splined to the second clutch hub and disposed between the second pressure plate and the second reaction plate; and a third friction plate splined to the third clutch hub and disposed between the third pressure plate and the third reaction plate.

14. The transmission of claim 13 wherein the shell is not fixedly coupled to any gear.

15. The transmission of claim 12 further comprising:

a hollow shaft fixedly coupled to the shell, the hollow shaft having an inner surface, an outer surface, and defining at least three passageways from the inner surface to the outer surface; and at least four seals defining at least three chambers between the input shaft and the inner surface to fluidly connect each of the at least three passageways in the hollow shaft to a corresponding passageway in the input shaft.

16. The transmission of claim 15 wherein:

the hollow shaft defines a fourth passageway between the inner surface and three axial locations along the outer surface; and the at least four seals define a fourth chamber between the input shaft and the inner surface fluidly connecting the fourth passageway to a corresponding fourth passageway in the input shaft.

17. A transmission comprising:

an input shaft defining four axial passageways;

a hollow shaft supported for rotation about the input shaft and defining four radial passageways;

five seals in contact with the input shaft and with the hollow shaft to define four chambers fluidly connecting the axial passageways to respective radial passageways; and three clutches configured to couple the hollow shaft to three gears in response to fluid pressure in three of the axial passageways, respectively.

18. The transmission of claim 17 wherein the hollow shaft is not fixedly coupled to any gear.

19. The transmission of claim 17 further comprising:

a first planetary gear set having a first sun gear, a first ring gear, and a first carrier;

a second planetary gear set having a second sun gear fixedly coupled to the first sun gear, a second ring gear being a first of the three gears, and a second carrier fixedly coupled to the input shaft;

a third planetary gear set having a third sun gear fixedly coupled to the second ring gear, a third ring gear being a second of the three gears, and a third carrier fixedly coupled to the first carrier; and a fourth planetary gear set having a fourth sun gear being a third of the three gears, a fourth ring gear fixedly coupled to the first carrier, and a fourth carrier fixedly coupled to an output shaft.

* * * * *